UNITED STATES PATENT OFFICE.

HENRY V. DUNHAM, OF NEW YORK, N. Y., ASSIGNOR TO CASEIN COMPANY OF AMERICA, A CORPORATION OF NEW JERSEY.

CASEIN COMPOUND.

SPECIFICATION forming part of Letters Patent No. 717,085, dated December 30, 1902.

Application filed April 7, 1902. Serial No. 101,820. (No specimens.)

*To all whom it may concern:*

Be it known that I, HENRY V. DUNHAM, a citizen of the United States, residing at New York, in the county of New York and State of New York, have invented or discovered certain new and useful Improvements in Casein Compounds and Methods of Producing Same, of which the following is a specification.

This invention or discovery has for its object to produce a casein compound from which a very thin casein solution may be made with a comparatively small amount of water.

The casein compounds at present in use require at least from three and one-half to four times their weight of water in order to get the casein solutions sufficiently thin for working, as in paper-coating, veneering, &c., and in many cases water to the quantity of five to six times, by weight, of the casein compounds is required to get a solution thin enough to manipulate in a practical way. If a casein solution used, for example, in paper-coating be too thick, it will not in making the heavy clay coatings flow together in such a manner as to make a smooth surface, owing to the thickness of the casein solution and the false body that it possesses, so that the brush-marks of the machine will not disappear before the drying retards flowing of the solution, and thus the brush-marks will appear in the finished surfaces. To obviate this objection as far as possible, it has heretofore been found necessary in the use of casein solutions for paper-coatings to give the paper two coats of the solution, owing to the fact that if one heavy clay casein-solution coating were applied the brush-marks caused by the paper-machine would not sufficiently disappear to result in smooth surfaces on the paper, and if sufficient water were added to make the casein solution so thin as to enable it to flow freely the drying would be very slow, which is a great objection. I have discovered, however, that by the use of an oxalate or a soluble salt of oxalic acid in the casein compound a casein composition may be produced which will be soluble in about two and one-half times its weight in water and still form a very thin solution which will flow so freely that a single coating only need be applied to papers in using the casein solution with heavy clay paper-coatings, and this thin oxalate casein solution will still dry very quickly. The oxalate casein compound may be obtained by adding a soluble salt of oxalic acid to dry or moist casein or to the milk before precipitating the latter with an acid, or in place of using a soluble oxalate the milk may be precipitated with oxalic acid. I do not wish to limit myself to any particular oxalate, but prefer to use the potassium salt. The amount necessary to obtain the required results may be varied somewhat in accordance with the nature of the solution desired.

In practicing my invention or discovery I preferably form a casein compound by adding to one hundred pounds of dry commercial casein about two pounds of potassium oxalate and about fifteen pounds of powdered borax or any other equivalent solvent with an alkaline reaction. These several ingredients are thoroughly mixed together in a dry state, forming a casein compound which may be dissolved by the addition thereto of about two and one-half parts, by weight, of water to each part of the oxalate casein compound, the water being preferably heated to about 160° Fahrenheit in dissolving the casein compound, thereby forming a casein solution which is thin enough to manipulate in the arts in a practical and commercial way, but which will not contain so much water that an objectionably long time will be required for drying the solution when properly spread upon the parts to be coated therewith.

The invention or discovery is not to be understood as being limited to the exact proportions or ingredients herein stated or to any special oxalate, as different oxalates may be employed to result in the stated proportions of the ingredients may be varied somewhat in accordance with the nature of the solution which may be desired.

Having thus described my invention or discovery, I claim and desire to secure by Letters Patent—

1. The herein-described casein compound formed by adding about two parts of a soluble salt of oxalic acid and about fifteen pounds of a powdered solvent with an alkaline reaction, to about one hundred pounds of dry commercial casein.

2. The herein-described casein compound consisting of about one hundred parts of dry commercial casein, about two parts of potassium oxalate and about fifteen parts of powdered borax, all thoroughly mixed together.

3. A casein compound comprising casein, oxalic acid and a solvent with an alkaline reaction.

4. The herein-described process for producing a casein compound, adapted to form a thin solution with a comparatively small amount of water, the same consisting in incorporating salts of oxalic acid with the casein to be used in the casein solution.

In testimony whereof I affix my signature in presence of two witnesses.

HENRY V. DUNHAM.

Witnesses:
H. KIBBE BROOKS,
W. J. ROIDER.